March 25, 1958  M. S. LARSON  2,828,102
VALVE ACTUATOR LATCH MEANS
Filed Dec. 3, 1951
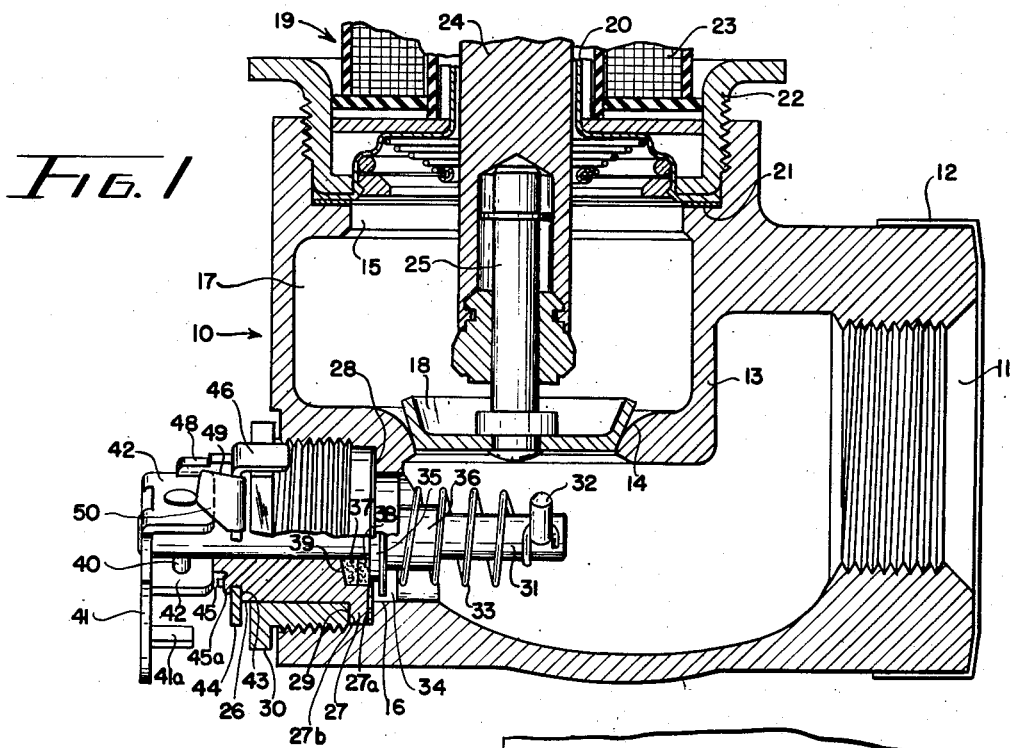
Fig. 1
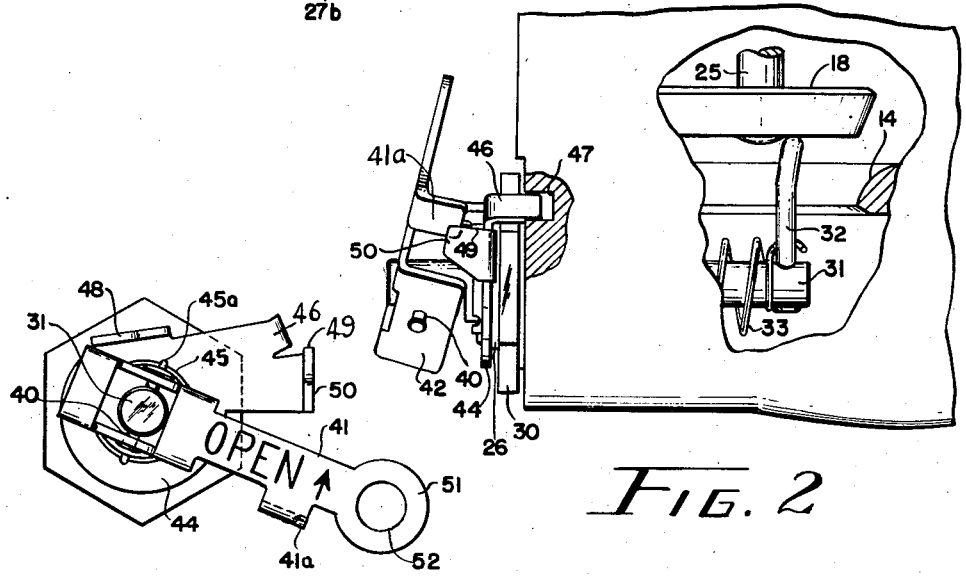
Fig. 2
Fig. 3
INVENTOR.
MARTIN S. LARSON
BY
ATTORNEY United States Patent Office 2,828,102
Patented Mar. 25, 1958

2,828,102

VALVE ACTUATOR LATCH MEANS

Martin S. Larson, Minneapolis, Minn., assignor to Minneapolis-Honeywell Regulator Company, Minneapolis, Minn., a corporation of Delaware Application December 3, 1951, Serial No. 259,620

5 Claims. (Cl. 251—66)

This invention relates to a power operated valve and, more particularly, to a power operated valve wherein manual operating means is also provided for actuating the valve to its open position when electric power is not available. One of the objects of the invention is to provide an electrically operated valve that is particularly suitable for use in floor furnaces as well as for general application.

Another object of the invention is to provide a simple, compact and inexpensive manual actuator for a solenoid valve wherein the manual actuating means is operable from the side of the valve.

Another object of the invention is to provide a manual actuator for a solenoid valve wherein means is provided for latching the valve in its open position but has means for preventing accidental latching of the valve in its open position.

A still further object of the invention is to provide a manual valve operating means in the form of a subassembly which may be inserted in a power operated valve by a very simple connection.

Another object of the invention is to prove a manual operating unit for a power valve wherein a single spring serves the triple function of holding the actuating means in its valve closed position, holding an external actuating arm in its non-latching position and in holding packing means in its sealing relationship with the actuating means.

Other objects of the invention will become apparent upon reading the following detailed description of the invention in conjunction with the accompanying drawing, wherein:

Figure 1 is a vertical sectional view through the preferred embodiment of the invention with the manual actuating means shown partly in elevation and partly broken away and with the valve in its closed position;

Figure 2 is a fragmentary view of the valve body of Figure 1 showing portions thereof broken away and the manual actuating means shown in its latched, valve-open position; and Figure 3 is an end view of the manual actuating means in its unlatched or valve-closed position.

Referring to Figure 1 of the drawing, the reference numeral 10 generally designates the valve body having an outlet 11 covered by a removable protective cap 12, a partition wall 13 in which a valve seat 14 is provided, an opening 15 in the top thereof, and an opening 16. The inlet to the valve body (not shown) communicates with a chamber 17 above a valve 18 shown seated on the valve seat 14.

The actuating means for the valve 18 is a solenoid unit, generally designated by the reference numeral 19. It comprises a solenoid tube 20 clamped against a shoulder 21 around the opening 15 by means of a ring nut 22 screw threaded into the upper end of the opening 15. A solenoid coil 23 surrounds the tube 20 and is secured thereon in any conventional manner. A plunger 24 is slidable in the tube 20 and is connected to the valve 18 by means of stem 25. The details of the power actuating means for the valve 18 form no part of this invention but are merely illustrated for sake of clarity.

The manual actuating means for the valve 18 comprises a bearing sleeve 26 having an annular rib 27 thereon spaced inwardly a short distance from the inner end thereof and providing an abutment shoulder 27a for engagement with the bottom of an annular shoulder 28 formed in the opening 16 of the valve body. The annular rib 27 also provides an abutment shoulder 27b for engagement by the inner end 29 of a ring clamping nut 30 rotatably mounted on said sleeve and screwthreaded into the threaded outer end of the bore 16. A gasket is povided between the shoulder 28 and the sleeve 26. It is thus seen that a swivel connection is provided between the clamping nut and the bearing sleeve for tightly holding the sleeve against the gasket and in sealing engagement with the valve body.

A shaft 31 extends through and beyond each end of the sleeve 26 and carries at the inner end thereof a laterally extending actuating arm 32 that is adapted, when rotated, to press against the under surface of the valve 18 and slide thereacross upon further rotation of the shaft to lift the valve to open position, as shown in Figure 2. A coiled spring 33 has one end thereof hooked around the arm 32 and the other end thereof anchored slidably in a slot 34 in the inner end of the sleeve 26. The outer end of the coil spring 33 also bears against an annular shoulder or flange 35 of a sleeve or collar 36 slidably mounted on the shaft 31 for resiliently forcing packing washers 37 and 38 into a tapered axial bore 39 in the inner end of the bearing sleeve 26, to provide a gas tight seal between the shaft 31 and sleeve 26.

Secured to the outer end of the shaft 31 by means of a pivot pin 40 is a manually operable lever or handle 41 having a pair of inwardly extending and parallel arms 42. The inner edges of the arms 42 are rounded at each end thereof with a flat portion there between for bearing engagement with the outer end of the sleeve 26. The spring 33 is so tensioned that the shaft 31 is urged inwardly and clockwise as viewed from outside the valve body. This causes the lever 41 to be held substantially at right angles to the axis of the shaft 31 by the outer end of the spring 33 reacting against the shoulder 35 of sleeve 36 and the packing washers to hold the flat surface of the arms 42 against the flat end of the bearing sleeve 26.

Non-rotatably secured to the outer end of the bearing sleeve 26 against a shoulder 43 thereon, is an anchoring plate 44. It is held against said shoulder 43 by staking over the outer surface thereof, portions 45a of an axially extending annular rib 45 on the sleeve 26, at spaced points around said rib. The anchoring plate has an inwardly extending arm 46 that fits in a socket 47 formed in the wall of the valve body 10 (Figure 2). The plate also has a laterally and outwardly extending abutment shoulder 48 that is adapted to be engaged by the arm 42 on one side of the pivot pin 40 in the normal valve-closed position of the lever with the arm 32 out of engagement with the valve and the arm 41 in its lowered position as shown in Figure 3 and on the opposite side of the abutment 48 by the portion of the arm 42 on the opposite side of said pin when the valve is moved to its open position, to limit the opening movement of the valve and to thus advise the operator that the open position of the valve has been reached. In this last mentioned position, the lever is then adapted to be deflected laterally by moving about the pivot 40 to move the handle portion toward the valve body, to position an inwardly extending latch arm 41a on the lever 41 behind a latching shoulder 49 on an outwardly extending abutment member 50 on the anchoring plate 44. The length of the arm 41a is such as to clear abutment 50 when the arm 41 is rotated about pivot 31. The shoulder 49 is beveled slightly inwardly and downwardly to provide a surface off of which the latching arm will not slip of its own accord upon permitting the lever to bear against the shoulder 49 under the bias of spring 33 before completely releasing said lever. The free end of the lever 41 has an enlarged portion 51 with an aperture 52 therein for reception of the end of a remote actuating means for the lever, such as would be used in floor furnace installations.

Operation

In operating the valve to its open position by means of the above described manual actuating means, the lever 41 is moved counterclockwise in the direction of the arrow, as shown in Figure 3, until the arm 42 engages the right hand end of the abutment 48, as viewed in Figure 3, whereupon the valve may be latched in this open position by either laterally deflecting the arm 41 to position the latch arm 41a behind latch shoulder 49 or by latching by any suitable means the remote end of a long actuating means (not shown) connected to the free end of the lever, in the event that such a means is used. It is thus seen that in the event a remote actuator is used, there is no danger of the lever 41 accidentally becoming latched in its open position by means of the latching means 41a and 49 inasmuch as it would require considerable lateral force on the end of the lever, to cause the compression of spring 33, due to the camming action of the inner surface of the arms 42 on the outer end of the bearing sleeve. With this arrangement, the latching means shown in the drawing and described above will provide for the latching of the valve in its open position, when the valve body is easily accessible, but prevents accidental latching of the valve in its open position by this same means when the valve is used in an installation, such as a floor furnace installation, wherein other latching means is provided for holding the valve open and it would be highly undesirable for the valve to be accidentally latched by the means provided on the valve body. It will be noted that the spring 33 serves a triple function of providing return rotational movement of the valve actuating means to its valve-closed position as well as axial movement of the shaft to cause the actuating lever to be held in its non-latching position and in urging the packing means resiliently into sealing engagement with the bearing sleeve and the shaft extending therethrough.

It will be further noted that the manual actuating means for the valve is easily removed from and inserted into the valve body by a simple swiveled nut connector on the bearing sleeve of the unit. Thus, if the manual actuator is not needed, it may be readily removed and a plug inserted where the manual actuating unit was. Likewise, if the valve was originally furnished with a plug in the opening 16, a very simple operation is all that is required to remove said plug and insert the manual actuating unit.

Having thus described the preferred embodiment of the invention, it will be readily apparent to those skilled in the art that other modifications may be made therein without departing from the spirit of the invention. Therefore, it is to be expressly understood that the scope of the invention is to be determined solely from the appended claims.

I claim as my invention:

1. A manual actuator for a power operated valve comprising a bearing sleeve having a longitudinally extending slot in the inner end thereof, a shaft rotatably mounted in and extending through and beyond each end of said sleeve, a valve actuating arm extending laterally from one end of said shaft, packing means around said shaft, a combined torque and compression spring between said arm and packing, the ends of said spring being anchored on said arm and in said slot, respectively, a lever pivoted near one of its ends on the other end of said shaft, said lever having a flattened cam surface bearing against one end of said sleeve for holding said lever substantially at a right angle to said shaft, an anchoring plate secured to said one end of said sleeve adjacent said cam surface and having an anchoring arm extending laterally toward said one end of said shaft for nonrotatable engagement with a valve body and a first and a second spaced abutment shoulder extending laterally toward said other end, said first shoulder being engageable at opposite ends thereof by the side of said cam surface in valve open and valve closed positions respectively of said lever, the second of said shoulders being engageable by said lever only when said lever is moved to its valve open position and the lever is deflected into contact with the second shoulder against the bias of said spring tending to hold the flattened surface against the sleeve and the lever in its valve closed position, the friction that said spring causes between said second abutment shoulder and said lever being sufficiently great as to prevent said spring from returning said lever to its right angle position with respect to said shaft, and means on said sleeve for sealingly securing said sleeve to said valve body.

2. A manual actuator for a power operated valve comprising a bearing sleeve, a shaft rotatably mounted in and extending through and beyond each end of said sleeve, a valve actuating arm extending laterally from one end of said shaft, packing means around said shaft, a combined torque and compression spring between said arm and packing, a lever pivoted near one of its ends on the other end of said shaft, said lever having a flattened cam surface bearing against one end of said sleeve for holding said lever substantially at a right angle to said shaft, an anchoring plate secured to said one end of said sleeve adjacent said cam surface and having an anchoring arm extending laterally toward said one end of said shaft for nonrotatable engagement with a valve body and a first and a second spaced abutment shoulder extending laterally toward said other end, said first shoulder being engageable at opposite ends thereof by the side of said cam surface in valve open and valve closed positions respectively of said lever, the second of said shoulders being engageable by said lever only when said lever is moved to its valve open position and the lever is deflected into contact with the second shoulder against the bias of said spring tending to hold the flattened surface against the sleeve and the lever in its valve closed position, the friction that said spring causes between said second abutment shoulder and said lever being sufficiently great as to prevent said spring from returning said lever to its right angle position with respect to said shaft, and means for sealingly securing said sleeve to said valve body.

3. An actuating unit, for manually operating a normally power operated valve, comprising a bearing sleeve, a shaft rotatably mounted in and extending through and beyond each end of said sleeve, a valve actuating arm extending laterally from one end of said shaft and adapted to engage said valve at its outer end when said shaft is rotated, packing means around said shaft, a combined torque and compression means between said arm and packing and anchored on said arm and sleeve at opposite ends thereof, a lever pivoted near one of its ends on the other end of said shaft, said lever having a flattened cam surface bearing against one end of said sleeve for holding said lever substantially at a right angle to said shaft, an anchoring plate secured to said one end of said sleeve adjacent said cam surface and having an anchoring arm extending laterally toward said one end of said shaft for nonrotatable engagement with a valve body and a first and a second spaced abutment shoulder extending laterally toward said other end, said first shoulder being engageable at opposite ends thereof by the side of said cam surface in valve open and valve closed positions respectively of said lever, the second of said shoulders being engageable by said lever only when said lever is moved to its valve open position and the lever is deflected into contact with the second shoulder against the bias of said torque and compression means tending to hold the flattened surface against the sleeve and the lever in its valve closed position, the friction that said spring causes between said second abutment shoulder and said lever being sufficiently great as to prevent said spring from returning said lever to its right angle position with respect to said shaft, and means for sealingly securing said sleeve to said valve body.

4. A manual actuator for a power operated valve comprising a bearing sleeve, a shaft rotatably mounted in and extending through and beyond each end of said sleeve, a valve actuating arm extending from one end of said shaft, a combined torque and compression spring between said arm and sleeve, a lever pivoted near one of its ends on the other end of said shaft, said lever having a flattened cam surface bearing against one end of said sleeve for holding said lever substantially at a right angle to said shaft, an anchoring plate secured to said one end of said sleeve adjacent said cam surface and having an anchoring arm extending laterally toward said one end of said shaft for nonrotatable engagement with a valve body and a first and a second spaced abutment shoulder extending laterally toward said other end, said first shoulder being engageable at opposite ends thereof by the side of said cam surface in valve open and valve closed positions respectively of said lever, the second of said shoulders being engageable by said lever only when said lever is moved to its valve open position and the lever is deflected into contact with the second shoulder against the bias of said spring tending to hold the flattened surface against the sleeve and the lever in its valve closed position, the friction that said spring causes between said second abutment shoulder and said lever being sufficiently great as to prevent said spring from returning said lever to its right angle position with respect to said shaft, and means on said sleeve for securing said sleeve to said valve body.

5. A manual actuator for a power operated valve comprising a bearing sleeve, a shaft rotatably mounted in and extending through and beyond each end of said sleeve, a valve actuating arm extending laterally from one end of said shaft, packing means around said shaft, a combined torque and compression spring between said arm and packing, a lever pivoted near one of its ends on the other end of said shaft, said lever having a cam bearing against one end of said sleeve for holding said lever substantially at a right angle to said shaft, an anchoring plate secured to said one end of said sleeve adjacent said cam and having an anchoring arm extending laterally toward said one end of said shaft for nonrotatable engagement with a valve body and a first and a second spaced abutment shoulder extending laterally toward said other end, said first shoulder being engageable at opposite ends thereof by the side of said cam in valve open and valve closed positions respectively of said lever, the second of said shoulders being engageable by said lever only when said lever is moved to its valve open position and the lever is deflected into contact with the second shoulder against the bias of said spring tending to hold the cam against the sleeve and the lever in its valve closed position, the friction that said spring causes between said second abutment shoulder and said lever being sufficiently great as to prevent said spring from returning said lever to its right angle position with respect to said shaft, and means on said sleeve for sealingly securing said sleeve to said valve body.

References Cited in the file of this patent

UNITED STATES PATENTS

| | | |
|---|---|---|
| 748,487 | Doll | Dec. 29, 1903 |
| 1,128,846 | Carroll | Feb. 16, 1915 |
| 1,329,099 | Spencer | Jan. 27, 1920 |
| 1,331,025 | Riggin | Feb. 17, 1920 |
| 1,403,508 | Levin | Jan. 17, 1922 |
| 2,547,098 | Smith | Apr. 3, 1951 |

FOREIGN PATENTS

| | | |
|---|---|---|
| 484,927 | Great Britain | May 12, 1938 |